(12) United States Patent
Simmons et al.

(10) Patent No.: US 9,146,169 B2
(45) Date of Patent: Sep. 29, 2015

(54) METHOD AND SYSTEM FOR USE IN CONDITION MONITORING OF PRESSURE VESSELS

(71) Applicant: General Electric Company, Schenectady, NY (US)

(72) Inventors: Russell Keith Simmons, New Waverly, TX (US); Kelly Danielle Aguilar, Dickinson, TX (US); Danielle Yarber Archangel, Porter, TX (US); Curtis John Jacks, Katy, TX (US)

(73) Assignee: General Electric Company, Schenectady, NY (US)

( * ) Notice: Subject to any disclaimer, the term of this patent is extended or adjusted under 35 U.S.C. 154(b) by 462 days.

(21) Appl. No.: 13/684,737

(22) Filed: Nov. 26, 2012

(65) Prior Publication Data
US 2014/0144242 A1 May 29, 2014

(51) Int. Cl.
*G01L 11/00* (2006.01)
*G01L 9/00* (2006.01)

(52) U.S. Cl.
CPC .............. *G01L 9/001* (2013.01); *G01L 9/0008* (2013.01)

(58) Field of Classification Search
None
See application file for complete search history.

(56) References Cited

U.S. PATENT DOCUMENTS

| 4,665,393 | A | * | 5/1987 | Wilder et al. ................. 340/683 |
| 4,824,016 | A | | 4/1989 | Cody et al. |
| 5,022,268 | A | | 6/1991 | Wolf et al. |
| 5,652,145 | A | * | 7/1997 | Cody et al. ...................... 436/34 |
| 6,006,164 | A | * | 12/1999 | McCarty et al. ................ 702/56 |
| 2004/0143398 | A1 | * | 7/2004 | Nelson ............................. 702/14 |
| 2005/0087019 | A1 | * | 4/2005 | Face ............................... 73/649 |
| 2007/0038393 | A1 | | 2/2007 | Borah et al. |
| 2008/0000298 | A1 | | 1/2008 | Borah et al. |
| 2011/0167915 | A1 | * | 7/2011 | Kuehl et al. ..................... 73/649 |
| 2011/0279952 | A1 | * | 11/2011 | Sonyey et al. ........... 361/679.01 |

FOREIGN PATENT DOCUMENTS

| EP | 0385788 B1 | 3/1990 |
| EP | 0399796 B1 | 5/1990 |

* cited by examiner

*Primary Examiner* — Andre Allen
(74) *Attorney, Agent, or Firm* — Armstrong Teasdale LLP

(57) ABSTRACT

A condition monitoring system for a pressure vessel includes at least one vibration monitoring probe coupled to at least one pressure vessel component. The system also includes at least one computing device that includes a memory device configured to store data associated with the at least one vibration monitoring probe. The computing device also includes at least one input channel configured to receive the data associated with the at least one vibration monitoring probe. The computing device further includes a processor coupled to the memory device and the at least one input channel. The processor is programmed to determine a deterioration of the material condition of the at least one pressure vessel component by comparing at least a portion of the data associated with the at least one vibration monitoring probe with predetermined vibration parameters.

20 Claims, 6 Drawing Sheets

METHOD AND SYSTEM FOR USE IN CONDITION MONITORING OF PRESSURE VESSELS

BACKGROUND OF THE INVENTION

The present application relates generally to condition monitoring of systems and equipment, and more particularly, to a method and system for use in condition monitoring of pressure vessel components, e.g., feed injectors for gasifiers.

Many known gasifier systems include a reactor, i.e., a gasifier that defines a reaction chamber in which a fuel and oxygen mixture is gasified to form a hot product gas. As a result of this mixture, a by-product of liquefied slag flows downward therefrom. At least some of these known gasifier systems, such as, but not limited to, dry feed systems and slurry feed systems, channel or transport a solid feed or a slurry feed, respectively. For example, gasifier systems, such as integrated gasification combined-cycle (IGCC) plants and chemical production facilities, include a fuel supply system that is coupled upstream from a gasifier for channeling fuel to the gasifier. More specifically, in such systems, solid fuel, such as coal, may be channeled to the gasifier, wherein syngas may be generated.

Many known fuel feeds, either dry solids or slurries, are channeled into the gasifiers through one or more feed injectors. These feed injectors are subject to wear of varying magnitudes and varying durations during operation. Such wear may decrease an operational life span of the material condition of the feed injectors. Under such circumstances, operators may avoid premature and unexpected deterioration of the material condition, e.g., body cracking and/or erosion, by scheduled replacement of feed injectors that is, in some cases, premature with respect to the actual material condition of the feed injectors.

A known method of determining the need for replacement of the feed injectors includes monitoring of carbon monoxide (CO) in the cooling water supply and/or return to the feed injectors as an indication that the feed injector tip has developed cracks. Other indications may include temperature distributions on the gasifier shell that deviate from normal operational parameters and/or disruptions of the gasification process. However, such conditions merely indicated that a failure has already occurred, as opposed to providing an indication of pending failure with sufficient time to develop a remediation plan.

BRIEF DESCRIPTION OF THE INVENTION

In one embodiment, a condition monitoring system for a pressure vessel is provided. The system includes at least one vibration monitoring probe coupled to at least one pressure vessel component. The system also includes at least one computing device that includes a memory device configured to store data associated with the at least one vibration monitoring probe. The computing device also includes at least one input channel configured to receive the data associated with the at least one vibration monitoring probe. The computing device further includes a processor coupled to the memory device and the at least one input channel. The processor is programmed to determine a deterioration of the material condition of the at least one pressure vessel component by comparing at least a portion of the data associated with the at least one vibration monitoring probe with predetermined vibration parameters.

In another embodiment, a method of determining deterioration of a material condition of a pressure vessel component is provided. The method includes providing a computer-based condition monitoring system and coupling at least one vibration monitoring probe to a pressure vessel component. The method also includes generating vibration data associated with the material condition of the pressure vessel component. The method further includes determining deterioration of the material condition of the pressure vessel component by comparing at least a portion of the vibration data associated with the material condition of the pressure vessel component with predetermined vibration parameters.

In yet another embodiment, one or more non-transitory computer-readable storage media having computer-executable instructions embodied thereon is provided. When executed by at least one processor, the computer-executable instructions cause the at least one processor to compare at least a portion of real-time vibration data associated with at least one pressure vessel component with vibration data parameters stored in a condition monitoring system and determine deterioration of the material condition of the pressure vessel component.

DETAILED DESCRIPTION OF THE INVENTION

Figure 1:
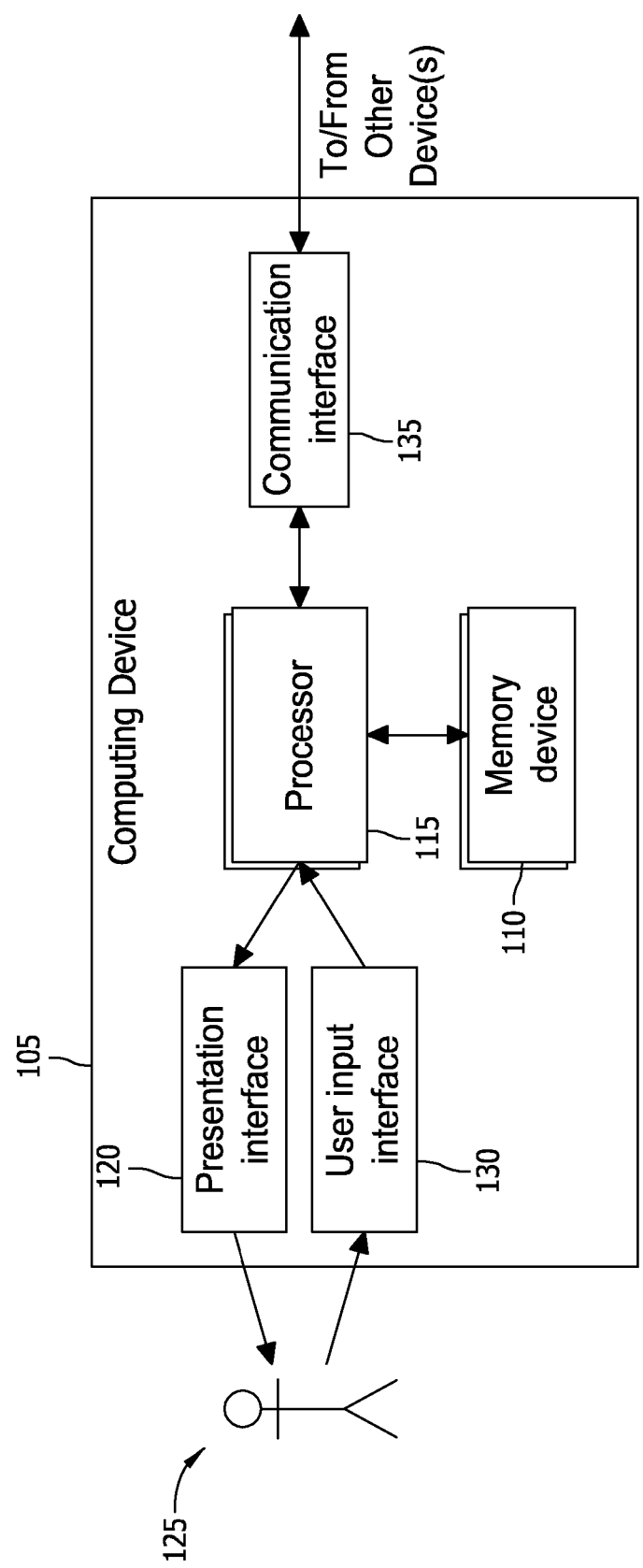
FIG. 1 is a block diagram of an exemplary computing device.

FIG. 1 is a block diagram of an exemplary computing device 105 that may be used to perform condition monitoring of any equipment, i.e., a pressure vessel component, including, without limitation, a feed injector for a gasifier (neither shown in FIG. 1). Computing device 105 includes a memory device 110 and a processor 115 operatively coupled to memory device 110 for executing instructions. Processor 115 may include one or more processing units (e.g., in a multi-core configuration). In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Further, as used herein, the terms "software" and "firmware" are interchangeable, and include any computer program stored in memory for execution by personal computers, workstations, clients and servers.

Moreover, as used herein, the term "non-transitory computer-readable media" includes all tangible, computer-readable media, such as a firmware, floppy disk, CD-ROMs, DVDs and another digital source such as a network or the Internet, as well as yet to be developed digital means, with the sole exception being a transitory, propagating signal.

Memory device 110 may be configured to store operational measurements including, without limitation, real-time and historical vibration values, and/or any other type data. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval. Also, memory device 110 includes, without limitation, sufficient data, algorithms, and commands to facilitate condition monitoring of the pressure vessel component, e.g., a gasifier feed injector (discussed further below).

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

In some embodiments, computing device 105 includes a presentation interface 120 coupled to processor 115. Presentation interface 120 presents information, such as a user interface and/or an alarm, to a user 125. In one embodiment, presentation interface 120 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 120 includes one or more display devices. In addition, or alternatively, presentation interface 120 includes an audio output device (not shown) (e.g., an audio adapter and/or a speaker) and/or a printer (not shown). In some embodiments, presentation interface 120 presents an alarm associated with the electrical switchgear being monitored, such as by using a human machine interface (HMI) (not shown in FIG. 1).

In some embodiments, computing device 105 includes a user input interface 130. In the exemplary embodiment, user input interface 130 is coupled to processor 115 and receives input from user 125. User input interface 130 may include, for example, a keyboard, a pointing device, a mouse, a stylus, a touch sensitive panel (e.g., a touch pad or a touch screen), and/or an audio input interface (e.g., including a microphone). A single component, such as a touch screen, may function as both a display device of presentation interface 120 and user input interface 130.

A communication interface 135 is coupled to processor 115 and is configured to be coupled in communication with one or more other devices, such as a sensor or another computing device 105, and to perform input and output operations with respect to such devices while performing as an input channel. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm to the communication interface 135 of another computing device 105.

Presentation interface 120 and/or communication interface 135 are both capable of providing information suitable for use with the methods described herein (e.g., to user 125 or another device). Accordingly, presentation interface 120 and communication interface 135 may be referred to as output devices. Similarly, user input interface 130 and communication interface 135 are capable of receiving information suitable for use with the methods described herein and may be referred to as input devices.

Figure 2:
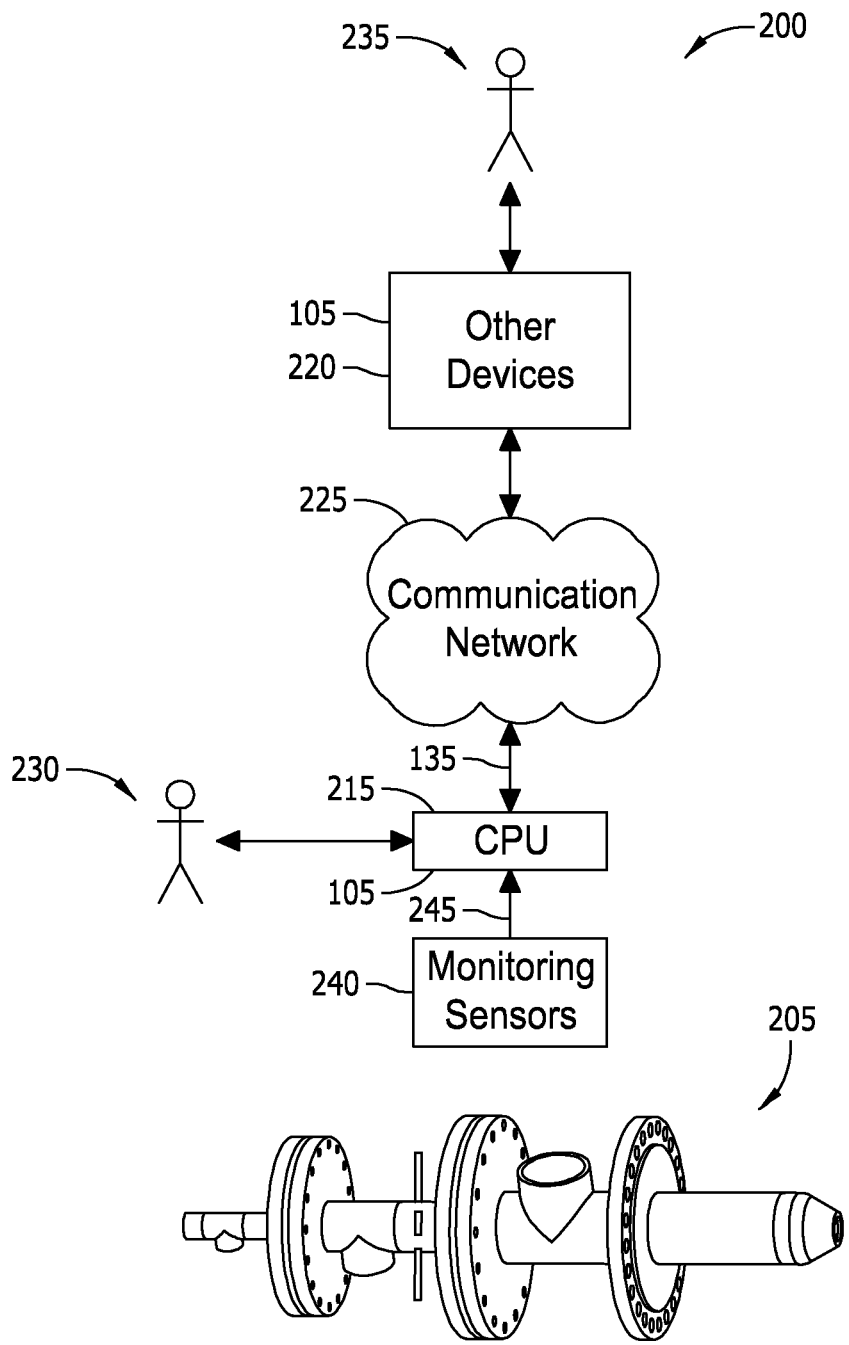
FIG. 2 is block diagram of a portion of an exemplary gasifier monitoring system.

FIG. 2 is block diagram of a portion of an exemplary pressure vessel monitoring system, e.g., in the exemplary embodiment, a gasifier monitoring system 200 that may be used to monitor at least a portion of, i.e., a component of, the pressure vessel, e.g., in the exemplary embodiment, a gasifier feed injector 205. Alternatively, any pressure vessel component may be monitored using a system substantially similar to system 200 as described herein, including, without limitation, coolant nozzles for nuclear reactors and feedwater nozzles for steam generators.

Gasifier monitoring system 200 includes at least one central processing unit (CPU) 215 that may be coupled to other devices 220 via a communication network 225. CPU 215 may be, without limitation, a facility-level centralized controller, a switchgear-level centralized controller, one of a plurality of distributed controllers, and a portable controller. Embodiments of network 225 may include operative coupling with, without limitation, the Internet, a local area network (LAN), a wide area network (WAN), a wireless LAN (WLAN), and/or a virtual private network (VPN). While certain operations are described below with respect to particular computing devices 105, it is contemplated that any computing device 105 may perform one or more of the described operations. For example, CPU 215 may perform all of the operations below.

Referring to FIGS. 1 and 2, CPU 215 is a computing device 105. In the exemplary embodiment, computing device 105 is coupled to network 225 via communication interface 135. In an alternative embodiment, controller 215 is integrated with other devices 220. As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits (none shown in FIG. 2), and these terms are used interchangeably herein.

CPU 215 interacts with a first operator 230 (e.g., via user input interface 130 and/or presentation interface 120). In one embodiment, CPU 215 presents information about gasifier feed injector 205, such as alarms, to operator 230. Other devices 220 interact with a second operator 235 (e.g., via user input interface 130 and/or presentation interface 120). For example, other devices 220 present alarms and/or other operational information to second operator 235. As used herein, the term "operator" includes any person in any capacity associated with operating and maintaining gasifier feed injector 205, including, without limitation, shift operations personnel, maintenance technicians, and facility supervisors.

In the exemplary embodiment, gasifier feed injector 205 includes one or more monitoring sensors 240 coupled to CPU 215 through at least one input channel 245. Monitoring sensors 240 collect operational measurements including, without limitation, vibration readings throughout gasifier feed injector 205. Monitoring sensors 240 repeatedly (e.g., periodically, continuously, and/or upon request) transmit operational measurement readings at the time of measurement. CPU 215 receives and processes the operational measurement readings. Also, CPU 215 includes, without limitation, sufficient data, algorithms, and commands to facilitate condition monitoring of gasifier feed injector 205 (discussed further below).

Also, in alternative embodiments, additional monitoring sensors (not shown) similar to monitoring sensors 240 may collect operational data measurements associated with the remainder of a gasifier (not shown), of which gasifier feed injector 205 is merely a portion of, including, without limitation, data from additional gasifier feed injectors 205, including, without limitation, local temperatures, pressures, and fuel flow rates. Such data is transmitted across network 225 and may be accessed by any device capable of accessing network 225 including, without limitation, desktop computers, laptop computers, and personal digital assistants (PDAs) (neither shown).

In the exemplary embodiment, monitoring sensors 240 may generate a large volume of data. Therefore, other devices 220 includes at least one data server with a database and storage system that enables operation of gasifier feed injector 205 and gasifier monitoring system 200 as described herein.

Figure 3:
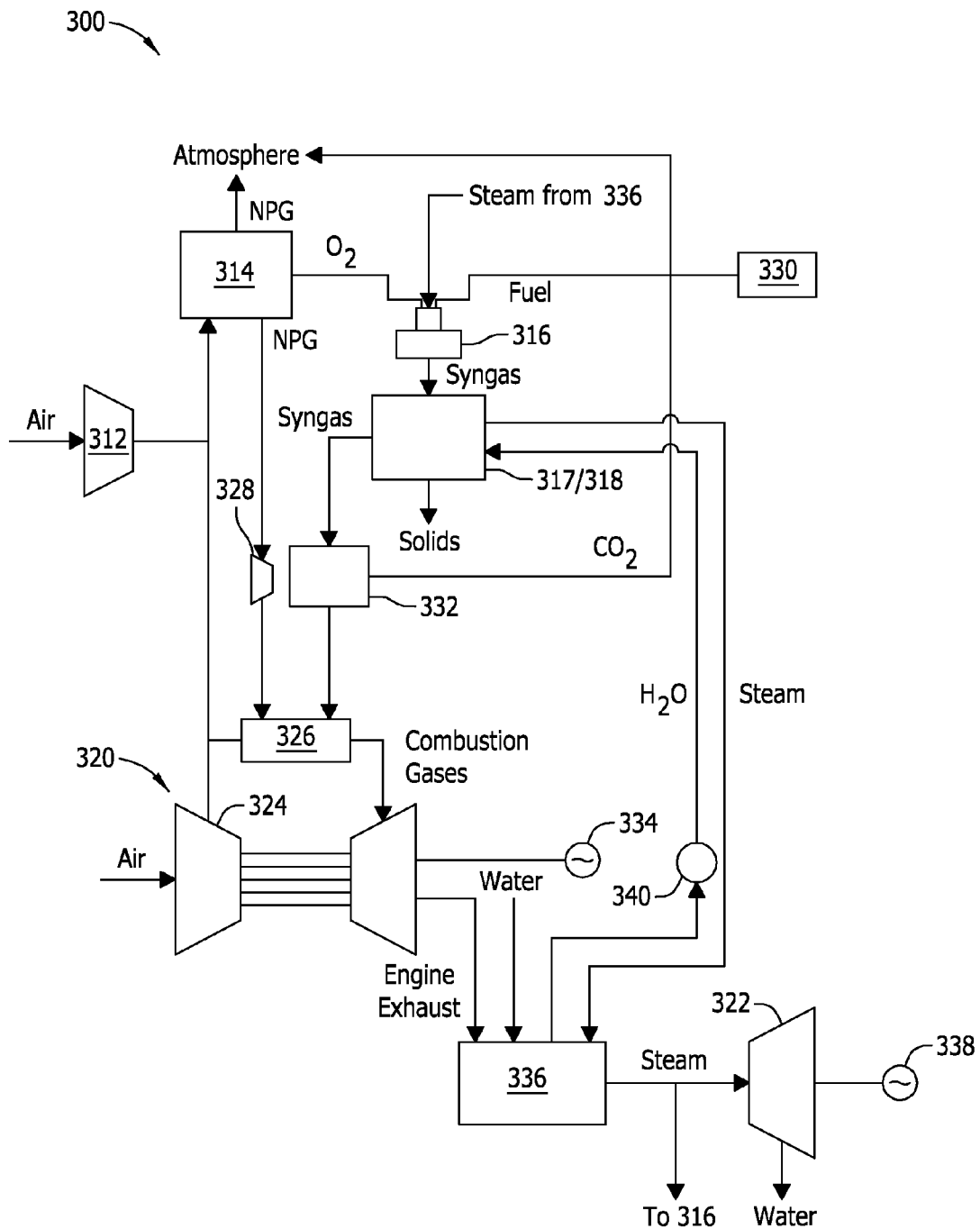
FIG. 3 is schematic view of an exemplary integrated gasification combined cycle (IGCC) power generation system that may be monitored with the gasifier monitoring system shown in FIG. 2.

FIG. 3 is a schematic diagram of an exemplary gasification facility, and more specifically, is a schematic diagram of an exemplary integrated gasification combined-cycle (IGCC) power generation system 300. IGCC system 300 generally includes a main air compressor 312, an air separation unit (ASU) 314 coupled in flow communication to compressor 312 and a quench-type gasifier 316 coupled in flow communication to ASU 314. In the exemplary embodiment, gasifier 316 is coupled to a quench system 317. Alternatively, gasifier 316 may be coupled to a syngas cooler 318. A gas turbine engine 320 is coupled in flow communication with quench system 317/syngas cooler 318. In the exemplary alternative embodiments, a steam turbine engine 322 is coupled in flow communication with syngas cooler 318. Also, alternatively, such gasification facility is a portion of any facility in any suitable configuration that enables operation of gasifier 316, including, without limitation, a chemical production plant.

In operation, compressor 312 compresses ambient air that is then channeled to ASU 314. In the exemplary embodiment, in addition to compressed air from compressor 312, compressed air from a gas turbine engine compressor 324 is supplied to ASU 314. Alternatively, compressed air from gas turbine engine compressor 324 is supplied to ASU 314, rather than compressed air from compressor 312 being supplied to ASU 314. In the exemplary embodiment, ASU 314 uses the compressed air to generate oxygen for use by gasifier 316. More specifically, ASU 314 separates the compressed air into separate flows of oxygen ($O_2$) and a gas by-product, sometimes referred to as a "process gas". The $O_2$ flow is channeled to gasifier 316 for use in generating synthesis gases, referred to herein as "syngas" for use by gas turbine engine 320 as fuel, as described below in more detail.

The process gas generated by ASU 314 includes nitrogen and will be referred to herein as "nitrogen process gas" (NPG). The NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 314, and at least some of the NPG flow is injected into a combustion zone (not shown) within a gas turbine engine combustor 326 to facilitate controlling emissions of engine 320, and more specifically to facilitate reducing the combustion temperature and reducing nitrous oxide emissions from engine 320. In the exemplary embodiment, IGCC system 300 includes a NPG compressor 328 for compressing the nitrogen process gas flow before being injected into a combustion zone (not shown) of gas turbine engine combustor 326.

In the exemplary embodiment, gasifier 316 converts a mixture of fuel supplied from a fuel supply 330, $O_2$ supplied by ASU 314, steam, and/or liquid water, and/or slag additive into an output of syngas for use by gas turbine engine 320 as fuel. Although gasifier 316 may use any fuel, gasifier 316, in the exemplary embodiment, uses coal, petroleum coke, residual oil, oil emulsions, tar sands, and/or other similar fuels. Furthermore, in the exemplary embodiment, syngas generated by gasifier 316 includes carbon monoxide, hydrogen, and carbon dioxide. In the exemplary embodiment, gasifier 316 is an entrained flow gasifier, configured to discharge syngas, slag, and fly ash vertically downward into quench system 317/syngas cooler 318. Alternatively, gasifier 316 may be any type and configuration that facilitates operation of gasifier monitoring system 200 (shown in FIG. 2) as described herein.

In the exemplary embodiment, syngas generated by gasifier 316 is quenched within quench system 317. Alternatively, syngas generated by gasifier 316 is channeled to syngas cooler 318 to facilitate cooling the syngas. The cooled syngas is channeled from either of quench system 317 or cooler 318 to a clean-up device 332 that facilitates cleaning the syngas before it is channeled to gas turbine engine combustor 326 for combustion therein. Carbon dioxide ($CO_2$) may be separated from the syngas during clean-up and, in the exemplary embodiment, may be vented to the atmosphere. Gas turbine engine 320 drives a first generator 334 that supplies electrical power to a power grid (not shown). Exhaust gases from gas turbine engine 320 are channeled to a heat recovery steam generator (HRSG) 336 that generates steam for driving steam turbine 322. Power generated by steam turbine 322 drives a second generator 338 that also provides electrical power to the power grid. In the exemplary embodiment, steam from heat recovery steam generator 336 may be supplied to gasifier 316 for generating syngas.

Furthermore, in the alternative exemplary embodiment, system 300 includes a pump 340 that supplies heated water from HRSG 336 to syngas cooler 318 to facilitate cooling syngas channeled from gasifier 316. The heated water is channeled through syngas cooler 318 wherein water is converted to steam. Steam from cooler 318 is then returned to HRSG 336 for use within gasifier 316, syngas cooler 318, and/or steam turbine 322.

Figure 4:
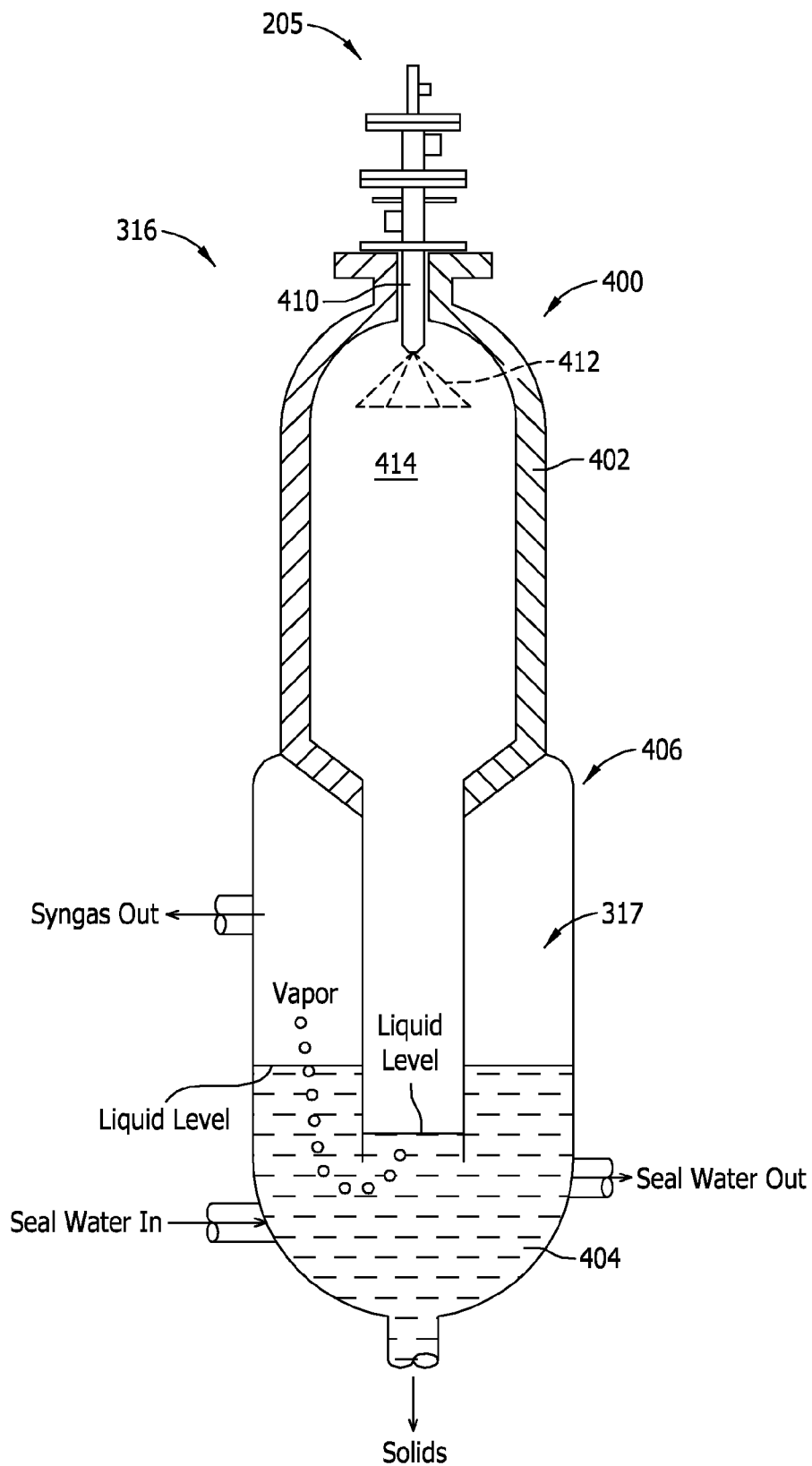
FIG. 4 is a schematic cross-sectional view of an exemplary gasifier that may be used with the IGCC power generation system shown in FIG. 3.

FIG. 4 is a schematic view of an exemplary quench-type gasifier 316 that may be used with IGCC power generation system 300 (shown in FIG. 3). In the exemplary embodiment, gasifier 316 includes a pressure vessel 400 having an upper shell 402, a lower shell 404, and a substantially cylindrical vessel body 406 extending therebetween. Quench system 317 is integrated within vessel body 406. Alternatively, gasifier 316 is coupled to a syngas cooler 318 (shown in FIG. 3).

Also, in the exemplary embodiment, a fuel feed injector 205 penetrates upper shell 402 to enable a flow of fuel to be channeled into gasifier 316. Feed injector 205 includes a fuel injection nozzle 410 that discharges the fuel in a pattern 412 into a combustion zone 414 defined in gasifier 316. Fuel injection nozzle 410 may include a variable annulus such that pattern 412 may be varied depending on desirable operational characteristics.

Fuel flows through one or more passages (not shown in FIG. 4) defined in feed injector 205 and exits feed injector 205 through nozzle 410. The fuel may be mixed with other substances prior to entering nozzle 410, and/or may be mixed with other substances after being discharged from nozzle 410. For example, without limitation, the fuel may be mixed with fines recovered from a process of IGCC system 300 prior to entering nozzle 410, and/or the fuel may be mixed with an oxidant, such as air or oxygen, at nozzle 410 or downstream from nozzle 410.

Figure 5:
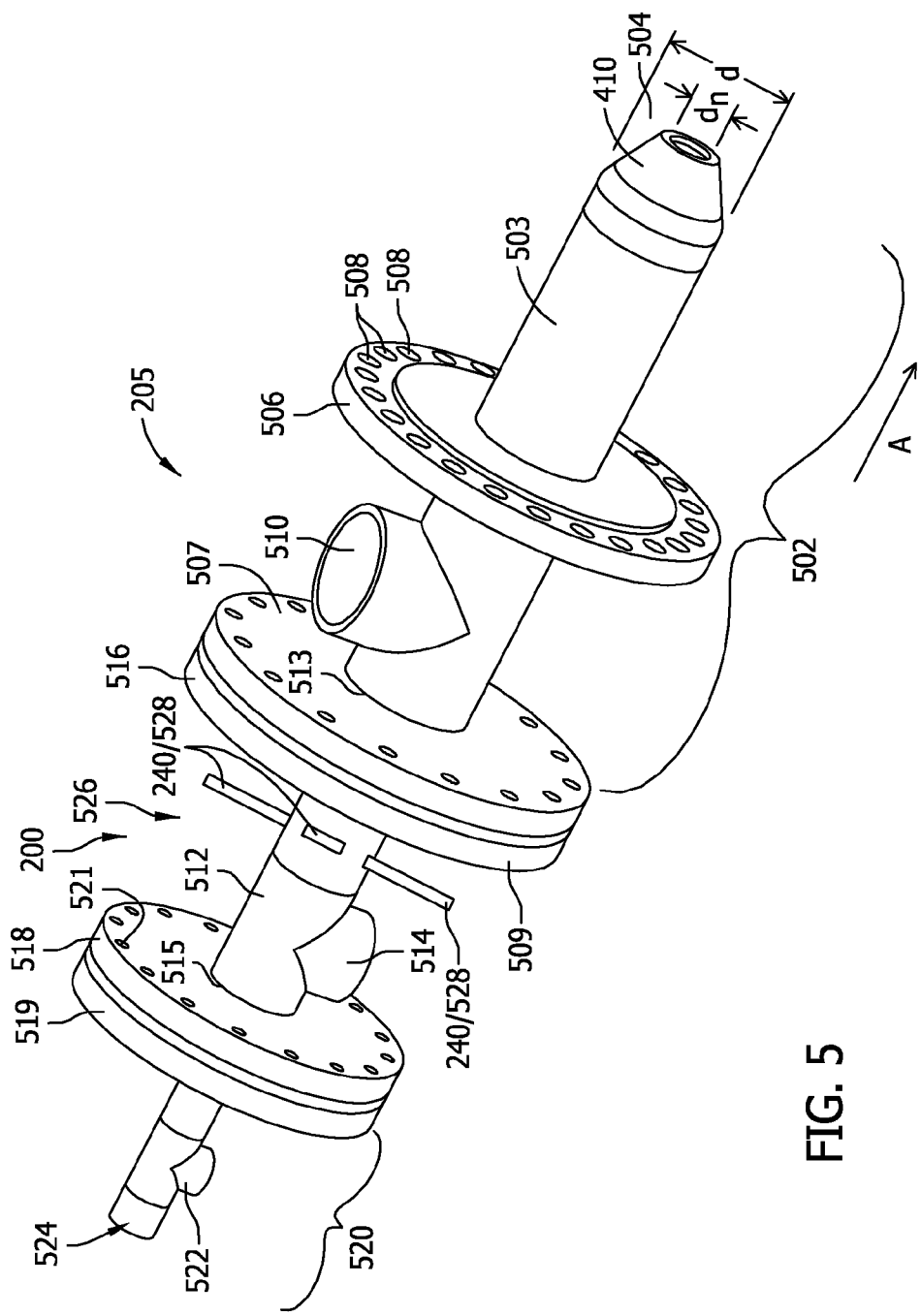
FIG. 5 is a schematic view of an exemplary feed injector that may be used with the gasifier shown in FIG. 4 with a portion of the gasifier monitoring system shown in FIG. 2.

FIG. 5 is a schematic view of gasifier feed injector 205 that may be used with gasifier 316 (shown in FIGS. 3 and 4) with a portion of gasifier monitoring system 200 (shown in FIG. 2). Fluids and/or gases are channeled in a direction though feed injector 205 as indicated by flow arrow A. As described herein, an object or feature is "downstream" from another object if it is located in the direction shown by arrow A from the object. Likewise, an object or feature is "upstream" from another object if it is located in a direction opposite of arrow A.

Gasifier feed injector 205 includes a mating end 502 configured to mate with and be inserted into gasifier 316. Mating end 502 is configured to direct a mixture of oxygen and fuel into gasifier 316 through a nozzle supply tube 503. Nozzle supply tube 503 has an outer diameter d and is coupled to nozzle 410. Nozzle 410 has an outlet hole 504 defined therein that has a nozzle diameter $d_n$. Nozzle 410 tapers from outer diameter d to nozzle diameter $d_n$.

Coupled to mating end 502 is an attachment plate 506 fixedly coupled to mating end 502. Attachment plate 506 includes a plurality of fastener holes 508 configured to receive bolts (not shown) to secure attachment plate 506 to gasifier 316. Mating end 502 facilitates inserting and securely maintaining nozzle 410 in gasifier 316 in a removable manner. At a location upstream of attachment plate 506, mating end 502 includes an oxygen inlet 510 coupled in flow communication with an oxygen supply (not shown) to facilitate the introduction of oxygen into gasifier feed injector 205 and gasifier 316.

Gasifier feed injector 205 also includes a first flange 516 fixedly coupled to an upstream end 513 of mating end 502. First flange 516 facilitates sealing mating end 502 such that oxygen or other gasses introduced at oxygen inlet 510 flow substantially only in the downstream direction. First flange 516 has an upstream side 509 and a downstream side 507. Downstream side 507 and upstream side 509 both include a hole (not shown) defined therethrough that is configured to receive mating end 502.

Gasifier feed injector 205 further includes a fuel inlet 514 configured to receive, for example, and without limitation, a coal slurry or other carbonaceous fuel. The fuel is passed through a fuel transmission nozzle 512 in the direction of arrow A.

Gasifier feed injector 205 also includes a second flange 518 fixedly coupled to upstream end 515 of fuel transmission nozzle 512. Second flange 518 facilitates sealing upstream end 515 of fuel transmission nozzle 512 such that coal slurry or other fuel introduced at fuel inlet 514 flows substantially only in the downstream direction. Second flange 518 has a downstream side 521 and an upstream side 519 that both define a hole (not shown) therethrough configured to receive fuel transmission nozzle 512.

Gasifier feed injector 205 further includes a secondary oxygen transmission nozzle 520 that includes a secondary oxygen inlet 522 configured to receive, for example, oxygen or other gasses. The oxygen is passed through secondary oxygen transmission nozzle 520 in the direction of arrow A.

In the exemplary embodiment, gasifier feed injector 205 is coupled to gasifier monitoring system 200 through a plurality, i.e., an array 526 of monitoring sensors 240, i.e., accelerometer-type vibration monitoring probes 528. Vibration monitoring probes 528 repeatedly (e.g., periodically, continuously, and/or upon request) transmit operational measurement readings at the time of measurement. CPU 215 (shown in FIG. 2) receives and processes the operational measurement readings. Also, CPU 215 includes, without limitation, sufficient data, algorithms, and commands to facilitate condition monitoring of gasifier feed injector 205 (discussed further below).

Array 526 of accelerometer-type vibration monitoring probes 528 is positioned upstream of first flange 516, e.g., between first flange 516 and second flange 518. In general, array 526 is positioned on the "cold" side of gasifier feed injector 205, i.e., a predetermined distance from gasifier vessel 402 (shown in FIG. 4) when injector 205 is positioned within gasifier 316.

In operation, array 526 records vibration data measured on gasifier feed injector 205 for a variety of recorded operating conditions for remote observation and review by operator 125 (shown in FIG. 1) and/or operators 230 and 235 (both shown in FIG. 2). Such data is temporarily stored in memory device 110 (shown in FIG. 1). Processor 115 (shown in FIG. 1) generates a plurality of vibration signatures using the recorded data to characterize nominal vibration modes for the spectrum of operating conditions. Such vibration signatures are defined by a plurality of vibration parameters. For example, and without limitation, such nominal vibration signatures may be used to characterize a "healthy" gasifier feed injector 205, i.e., an injector 205 that retains a predetermined value of time for additional service.

Abrupt changes in the vibration signature for a particular operating condition that exceed the predetermined parameters may be indicative of a degradation of the material condition of gasifier feed injector 205 for conditions that include, without limitation, accelerated and/or excessive erosion of feed injection nozzle 410 and cracks in feed injection nozzle 410 and/or nozzle supply tube 503 (both exposed to the high temperature erosive and corrosive environment within gasifier 316), interior and exterior wear of nozzle 410 and/or tube 503, and pluggage of nozzle 410 and/or tube 503.

Figure 6:
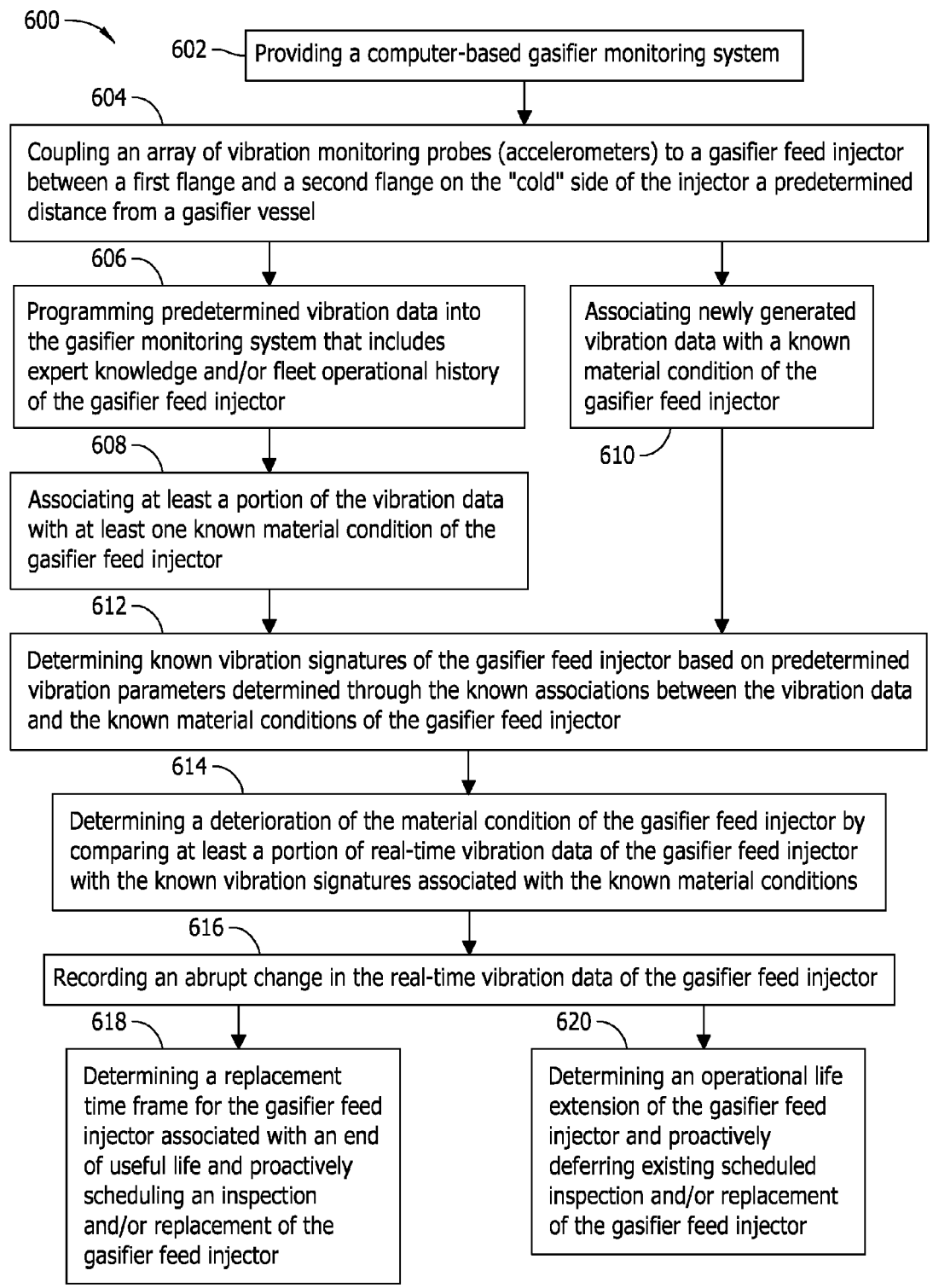
FIG. 6 is a flow chart of an exemplary method of performing condition monitoring using the system shown in FIGS. 2 and 5.

FIG. 6 is a flow chart of an exemplary method 600 of performing condition monitoring using gasifier monitoring system 200 (shown in FIGS. 2 and 5). More specifically, method 600 defines a method of determining deterioration of a material condition of gasifier feed injector 205 (shown in FIG. 2). Computer-based gasifier monitoring system 200 is provided 602. At least one vibration monitoring probe 528 (shown in FIG. 5), i.e., array 526 (shown in FIG. 5) of accelerometers is coupled 604 to gasifier feed injector 205 between first flange 516 and second flange 518 (both shown in FIG. 5) on the "cold" side of gasifier feed injector 205 a predetermined distance from gasifier vessel 402 (shown in FIG. 4).

In some embodiments, predetermined vibration data is programmed 606 into gasifier monitoring system 200 that includes expert knowledge and/or fleet operational history of gasifier feed injector 205. At least a portion of the vibration data is associated 608 with at least one known material condition of gasifier feed injector 205. Also, in some embodiments, newly generated vibration data is associated 610 with a known material condition of gasifier feed injector 205. Further, in some embodiments, known vibration signatures of gasifier feed injector 205 are determined 612 based on predetermined vibration parameters determined through known associations between the vibration data and known material conditions of gasifier feed injector 205.

A deterioration of the material condition of gasifier feed injector 205 is determined 614 by comparing at least a portion of real-time vibration data of gasifier feed injector 205 with the known vibration signatures associated with the known material conditions. For example, without limitation, recording 616 an abrupt change in the real-time vibration data of gasifier feed injector 205 may be indicative of a change in the material condition of gasifier feed injector 205. In some embodiments, a replacement time frame for gasifier feed injector 205 associated with an end of useful life is determined 618. Therefore, inspection and/or replacement of gasifier feed injector 205 may be proactively scheduled. Also, in some embodiments, an operational life extension of gasifier feed injector 205 is determined 620. Therefore, existing scheduled inspection and/or replacement of gasifier feed injector 205 may be proactively deferred. Moreover, such determinations of vibration signatures and associations of such signatures with known material conditions may be used to determine design changes for extending useful operational lifetimes of gasifier feed injector 205.

In contrast to known condition monitoring systems, the computer-based gasifier monitoring systems as described herein facilitate determining a change in the material condition of a fuel feed injector that may be indicative of a need to inspect and/or replace the feed injector prior to a feed injector failure. Such predictive determinations facilitate decreasing unplanned service interruptions. Also, in contrast to known condition monitoring systems, the computer-based gasifier monitoring systems as described herein facilitate determining whether real-time recorded vibration data is indicative of a real-time material condition such that scheduled inspection and/or replacements of the feed injector may be deferred, and the temporal length of the deferral. Therefore, unnecessary maintenance outages activities may be avoided, thereby facilitating a cumulative cost savings for operations and maintenance managers.

An exemplary technical effect of the methods, systems, and apparatus described herein includes at least one of (a) determining nominal vibration modes for the spectrum of operating conditions of a fuel feed injector; (b) determining a change in the material condition of a fuel feed injector that may be indicative of a need to inspect and/or replace the feed injector prior to a feed injector failure; and (c) determining whether real-time recorded vibration data is indicative of a real-time material condition such that scheduled inspection and/or replacements of the feed injector may be deferred, and the temporal length of the deferral.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention can be practiced with modification within the spirit and scope of the claims.

What is claimed is:

1. A condition monitoring system for a pressure vessel comprising:
    at least one vibration monitoring probe coupled to at least one pressure vessel component; and
    at least one computing device comprising:
        a memory device configured to store data associated with said at least one vibration monitoring probe;
        at least one input channel, said at least one input channel configured to receive the data associated with said at least one vibration monitoring probe; and
        a processor coupled to said memory device and said at least one input channel, said processor programmed to determine a deterioration of the material condition of the at least one pressure vessel component by comparing at least a portion of the data associated with said at least one vibration monitoring probe with predetermined vibration parameters.

2. A condition monitoring system in accordance with claim 1, wherein said processor is further programmed to determine at least one vibration signature of the at least one pressure vessel component using at least a portion of the data associated with said at least one vibration monitoring probe.

3. A condition monitoring system in accordance with claim 2, wherein said processor is further programmed to determine the deterioration of the material condition of the at least one pressure vessel component at least partially based on an abrupt change in the at least one vibration signature.

4. A condition monitoring system in accordance with claim 1, wherein said at least one vibration monitoring probe comprises a plurality of vibration monitoring probes configured in a predetermined array.

5. A condition monitoring system in accordance with claim 4, wherein said predetermined array of said plurality of vibration monitoring probes is coupled to a gasifier feed injector.

6. A condition monitoring system in accordance with claim 5, wherein said predetermined array of said plurality of vibration monitoring probes is coupled to the gasifier feed injector upstream of a coupling flange proximate the pressure vessel.

7. A condition monitoring system in accordance with claim 1, wherein said at least one vibration monitoring probe comprises at least one accelerometer.

8. A method of determining deterioration of a material condition of a pressure vessel component, said method comprising:
    providing a computer-based condition monitoring system;
    coupling at least one vibration monitoring probe to a pressure vessel component;
    generating vibration data associated with the material condition of the pressure vessel component; and
    determining a deterioration of the material condition of the pressure vessel component by comparing at least a portion of the vibration data associated with the material condition of the pressure vessel component with predetermined vibration parameters.

9. A method in accordance with claim 8, further comprising determining the material condition of the pressure vessel component comprising:
    programming predetermined vibration data into the condition monitoring system, wherein the vibration data includes at least one of expert knowledge of the pressure vessel component and fleet operational history of the pressure vessel component; and storing at least a portion of the vibration data and associating the at least a portion of the vibration data with at least one known material condition of the pressure vessel component.

10. A method in accordance with claim 9, wherein associating the at least a portion of the vibration data with at least one known material condition of the pressure vessel component comprises determining at least one vibration signature of the pressure vessel component.

11. A method in accordance with claim 9, wherein associating the at least a portion of the vibration data with at least one known material condition of the pressure vessel component comprises at least one of:

determining a pressure vessel component replacement time frame; and determining a pressure vessel component operational life extension.

12. A method in accordance with claim 8, wherein coupling at least one vibration monitoring probe to a pressure vessel component comprises coupling an array of a plurality of vibration monitoring probes to the pressure vessel component.

13. A method in accordance with claim 12, wherein coupling an array of a plurality of vibration monitoring probes to the pressure vessel component comprises coupling the array of vibration monitoring probes to a gasifier feed injector upstream of a coupling flange proximate the pressure vessel.

14. A method in accordance with claim 12, wherein coupling an array of a plurality of vibration monitoring probes to the pressure vessel component comprises coupling an array of accelerometers to a gasifier feed injector upstream of a coupling flange proximate the pressure vessel.

15. One or more non-transitory computer-readable storage media having computer-executable instructions embodied thereon, wherein when executed by at least one processor, the computer-executable instructions cause the at least one processor to:

compare at least a portion of real-time vibration data associated with at least one pressure vessel component with vibration data parameters stored in a condition monitoring system; and determine deterioration of the material condition of the pressure vessel component.

16. One or more non-transitory computer-readable storage media in accordance with claim 15, wherein when executed by at least one processor, the computer-executable instructions further cause the at least one processor to associate at least a portion of the vibration data with at least one known material condition of the pressure vessel component.

17. One or more non-transitory computer-readable storage media in accordance with claim 16, wherein when executed by at least one processor, the computer-executable instructions further cause the at least one processor to associate at least a portion of the vibration data with at least one known material condition of the pressure vessel component, wherein the vibration data includes at least one of expert knowledge of the pressure vessel component and fleet operational history of the pressure vessel component.

18. One or more non-transitory computer-readable storage media in accordance with claim 16, wherein when executed by at least one processor, the computer-executable instructions further cause the at least one processor to determine at least one vibration signature of the pressure vessel component to associate with at least one known material condition of the pressure vessel component.

19. One or more non-transitory computer-readable storage media in accordance with claim 16, wherein when executed by at least one processor, the computer-executable instructions further cause the at least one processor to determine the deterioration of the material condition of the at least one pressure vessel component at least partially based on an abrupt change in the real-time vibration data.

20. One or more non-transitory computer-readable storage media in accordance with claim 16, wherein when executed by at least one processor, the computer-executable instructions further cause the at least one processor to at least one of:

determine a component replacement time frame; and determine a component operational life extension.

* * * * *